Figure 1:
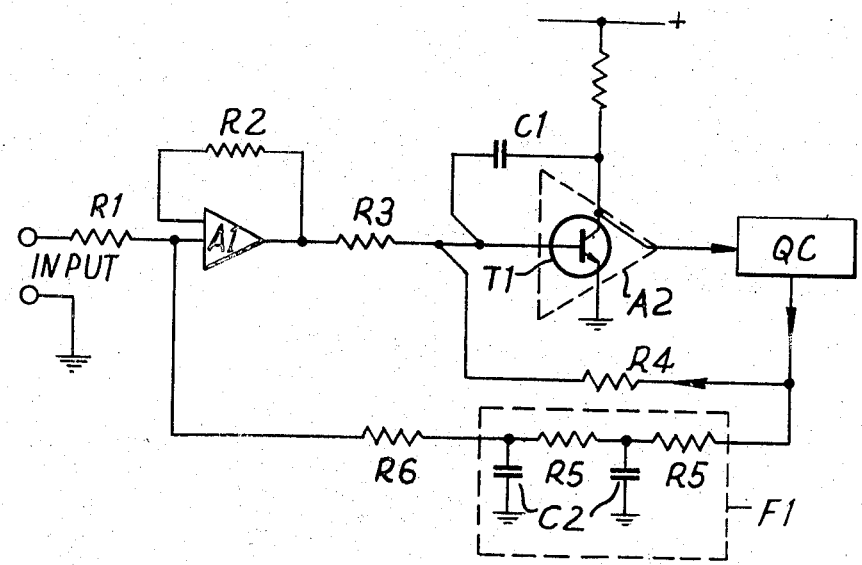

United States Patent [19]
Metcalf et al.

[11] 3,792,352

[45] Feb. 12, 1974

[54] ANALOG-TO-DIGITAL CONVERTER UTILIZING DIFFERENT FEEDBACK EFFECTS TO OBTAIN ACCURACY AND RESOLUTION

[75] Inventors: Eric Metcalf; Howard Anthony Dorey, both of Fainborough, England

[73] Assignee: The Solartron Electric Group Limited, Farnborough, England

[22] Filed: Sept. 10, 1970

[21] Appl. No.: 71,263

Related U.S. Application Data

[62] Division of Ser. No. 495,071, Oct. 12, 1965, abandoned.

[52] U.S. Cl. ......... 324/99 D, 324/111, 340/347 AD
[51] Int. Cl. ..... G01r 17/06, G01r 1/00, G01r 19/26
[58] Field of Search........ 324/99 D, 99 R, 111, 120; 340/347 AD

[56] References Cited
UNITED STATES PATENTS
3,296,613 1/1967 Andersen et al.................. 324/99 D Primary Examiner—Rudolph V. Rolinec
Assistant Examiner—Ernest F. Karlsen
Attorney, Agent, or Firm—William R. Sherman; Jerry M. Presson; Roylance, Abrams, Berdo & Kaul

[57] ABSTRACT

An analog-to-digital converter provides improved resolution without attendant loss of accuracy or speed of operation over known converters. This is achieved by providing slow-acting feedback to the integrating circuit for increasing resolution. The fast-acting feedback consists of quanta of charge of defined magnitude and the slow-acting feedback is derived from the fast feedback either by smoothing or by reducing the frequency of the quanta.

4 Claims, 6 Drawing Figures

ANALOG-TO-DIGITAL CONVERTER UTILIZING DIFFERENT FEEDBACK EFFECTS TO OBTAIN ACCURACY AND RESOLUTION

This is a division of Ser. No. 495,071, filed Oct. 12, 1965, now abandoned.

This invention relates to digital voltmeters (or analogue to digital, converters) of the type comprising an integrating amplifier to whose input the input voltage is, in operation, applied and feedback means responsive to the output level of the integrating amplifier so to control the feeding into the amplifier input of quanta of charge (i.e., standard units of charge) in opposition to the input voltage that the number of such quanta fed in or the rate at which such quanta are fed in becomes a digital measure of the input voltage. The quanta may also be referred to as quantum pulses. The voltage to be measured may be applied for a measured length of time, in which case the number of quanta is the digital measure of the voltage. Alternatively the voltage may be continuously applied, with matters so arranged that the amplifier output always remains substantially within the threshold limits corresponding to the feeding in of one quanta of charge. Under these circumstances it is the mean rate at which quanta are fed in which gives the digital measure of the voltage. It may be arranged to feed in quanta at the times of occurrence only of clock pulses. When a clock pulse occurs, a quantum either is or is not fed in, depending on whether the amplifier output at that time does or does not exceed a threshold value. The said mean rate is then given by the number of clock pulses when a quantum was fed in divided by the total number of clock pulses in any suitable measuring interval. Provision may be made for handling positive and negative voltages and positive and negative quanta may be counted in a variety of ways to obtain a variety of special results such as the mean value (d.c. level) or r.m.s. value of an alternating voltage.

Voltmeters of the nature described are now widely used and there is a continual demand for higher speed of operation, higher accuracy (that is higher overall linearity) and higher discrimination or resolution (that is a smaller increment of voltage corresponding to one quantum of charge). At the same time there is always the need for as cheap a product as possible consistent with the required performance.

High speed and high resolution can only be obtained at one end and the same time by using small quanta with a high frequency of occurrence. Naturally the actual frequency of occurrence during any particular measurement depends on the magnitude of the voltage being measured but the expression "quantum frequency" may be assigned to the frequency for a full scale reading. An increased quantum frequency improves the zero setting of the meter as well as its resolution, provided the total period of measurement is maintained and the same mark-space ratio for the quanta is maintained, i.e., the quantum size is made proportional to the quantum period. However, for an amplifier of given bandwidth the accuracy of measurement must deteriorate as the quantum frequency is raised because of the introduction of non-linearity. It can be shown that the accuracy actually falls off with the square of the frequency. Thus a higher amplifier gain must be used but this means that negative-feedback must be incorporated. Because of internal phase-shift the gain must be restricted at high operating frequencies. In consequence a time delay appears between the amplifier input and output. If the quantum waveform is substantially square and the quantum frequency is high, the edges naturally become steep; typically the leading edge may rise 6V in 20 nanosecs. Because of its time-delay, the amplifier input cannot behave as a virtual earth to such a rapid rise. It overloads, rectifies, and introduces non-linearity.

It is not satisfactory to increase the resolution merely by increasing the measurement period in view of the requirement for rapid operation. Some laboratory instruments for example are required to complete an entire measurement cycle within 20ms, in order that the digital count may be repeated at the period of mains frequency to eliminate jitter caused by hum components in the voltage to be measured. When large numbers of voltages have to be sampled cyclically, as in data logging, the measurement period may even have to be as small as 100µs, or less.

The object of the present invention is accordingly to alleviate the problem of conflicting requirements thus posed.

According to the invention there is provided a digital voltmeter of the type hereinbefore described wherein the feedback means are constructed to give both a relatively slow-acting feedback effect in order to obtain high accuracy and a relatively fast-acting effect in order to obtain high resolution.

In one embodiment of the invention a digital voltmeter of the type defined comprises a low gain, high bandwidth integrating amplifier to whose input the quanta of charge are applied and to whose input is also connected the output of a high gain, non-integrating operational amplifier adapted to amplify the input voltage, an overall, linearising, negative feedback signal which varies less rapidly than the quantum feedback signal being applied to the input of the said operational amplifier.

In this arrangement the integrating amplifier has poor linearity and a marked zero offset because of its low gain but can have very high bandwidth. This amplifier need comprise no more in fact than a single, high speed switching transistor (plus capacitive feedback to obtain the integrating action). The overall feedback restores the linearity and zero setting without detracting from the speed and resolution.

The linearising (slow-acting) feedback signal may be derived simply by smoothing the quantum feedback signal. In this way the rise time of the quantum waveform may be extended so as to allow the virtual earth to be preserved. The said signal may also be derived by frequency division from the quantum feedback signal.

Another way of alleviating the aforesaid problem in accordance with the invention may be used in combination with the arrangement just described or alone. According to another embodiment of the invention therefore, in a digital voltmeter of the type described means are provided for increasing the quantum frequency and decreasing the quantum size during the latter part only of a measuring interval. Thus initially the voltmeter is linear and accurate but has poor resolution. During the latter part of the measuring interval the resolution is increased without appreciably affecting the overall accuracy of the measurement. True, the basic accuracy is low when the quantum frequency is increased but this phase of the operation is responsible only for a small part of the total count.

In all embodiments of the invention so far outlined and to be described there is the unifying concept of using both a relatively slow-acting feedback effect in order to obtain high accuracy and a relatively fast-acting effect in order to obtain high resolution. The two effects are either used simultaneously (when there are separate feedback paths for each) or one after the other (the slow-acting effect first).

Figure 2:
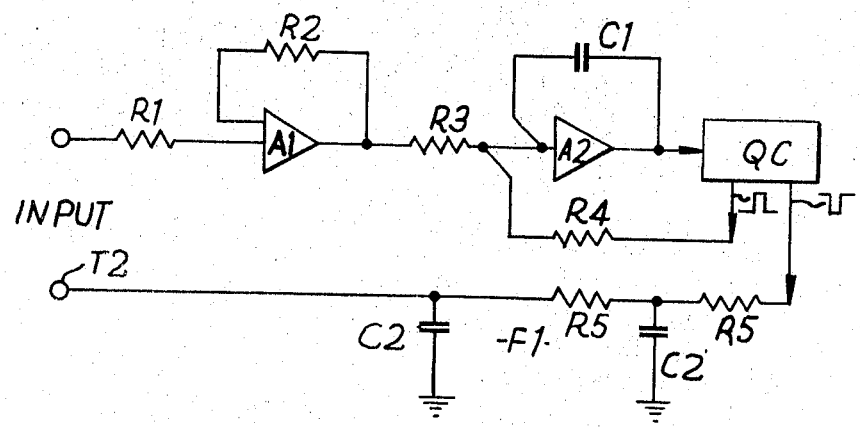
Figure 3:
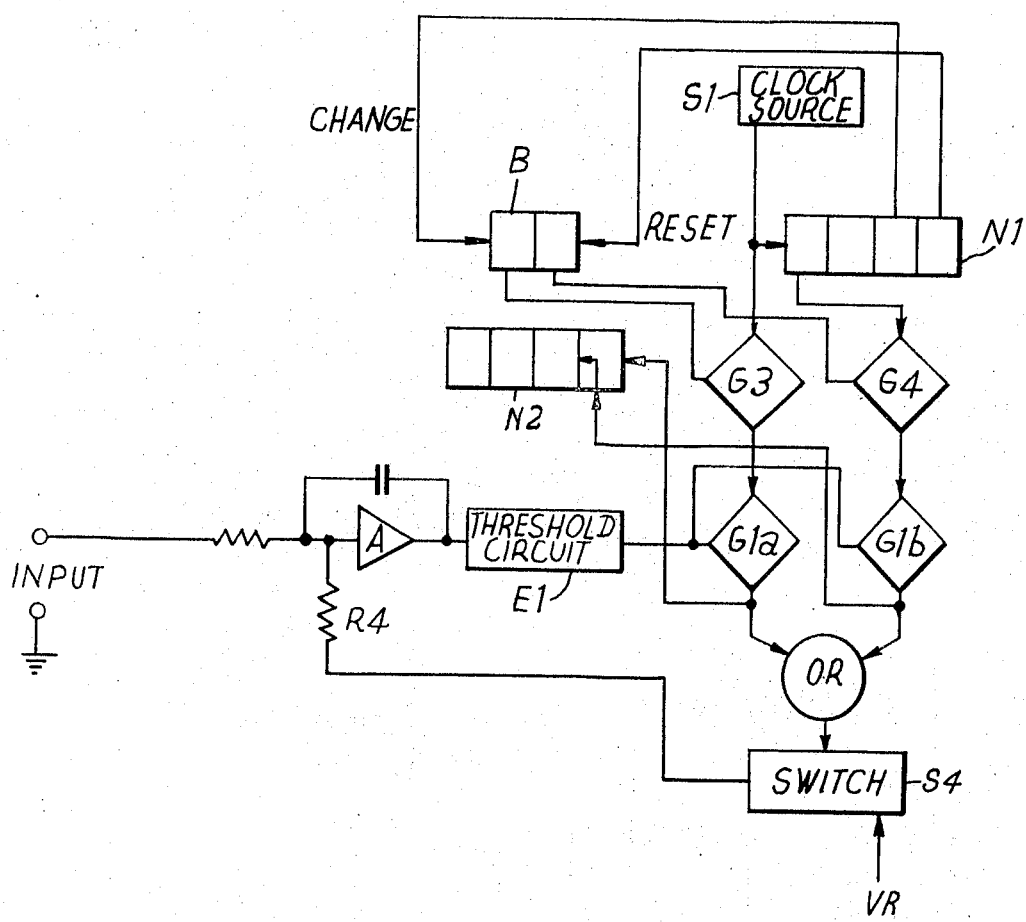
Figure 4:
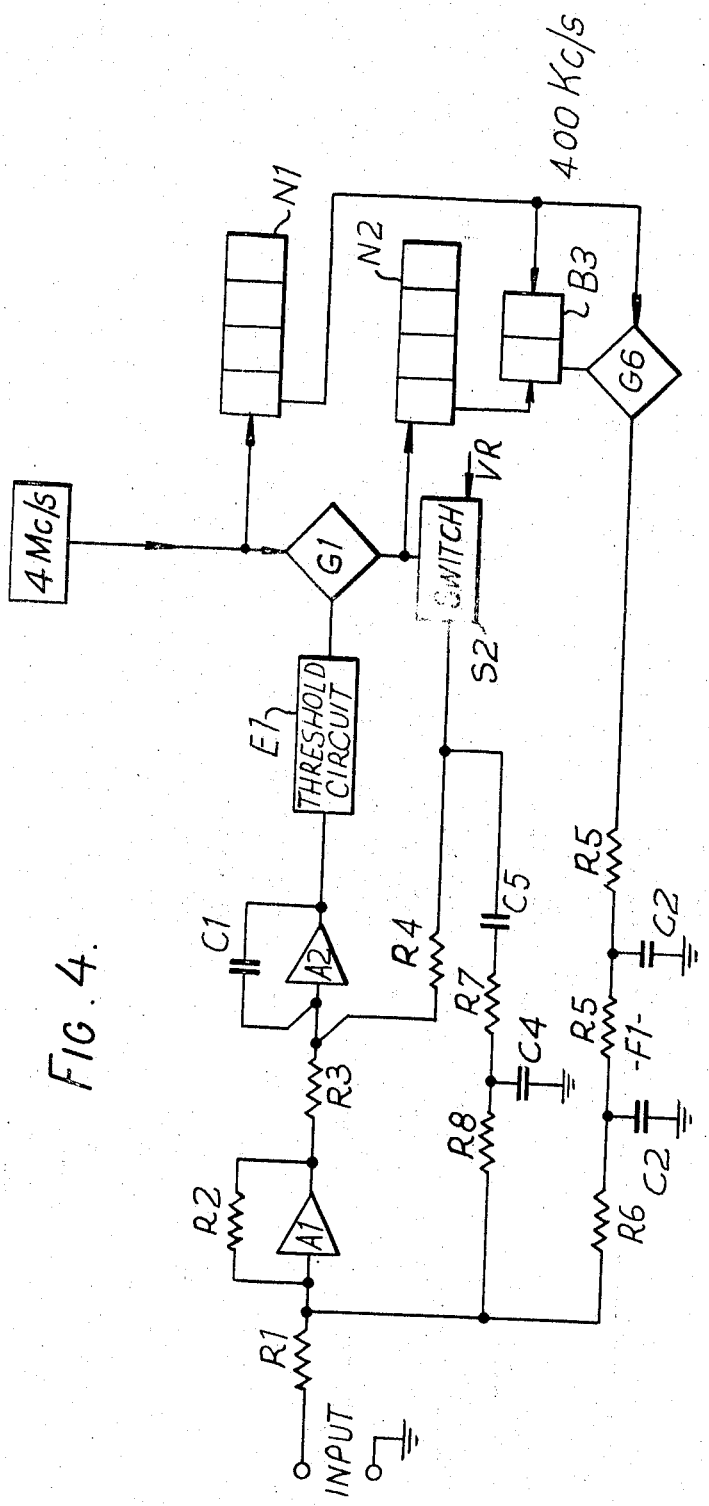
Figure 5:
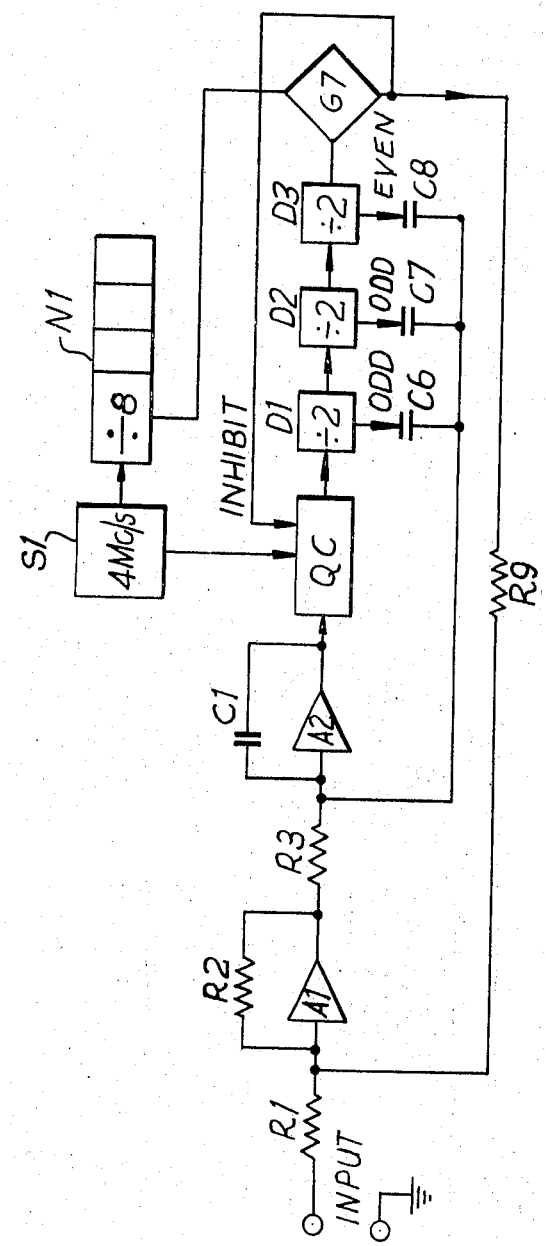
Figure 6:
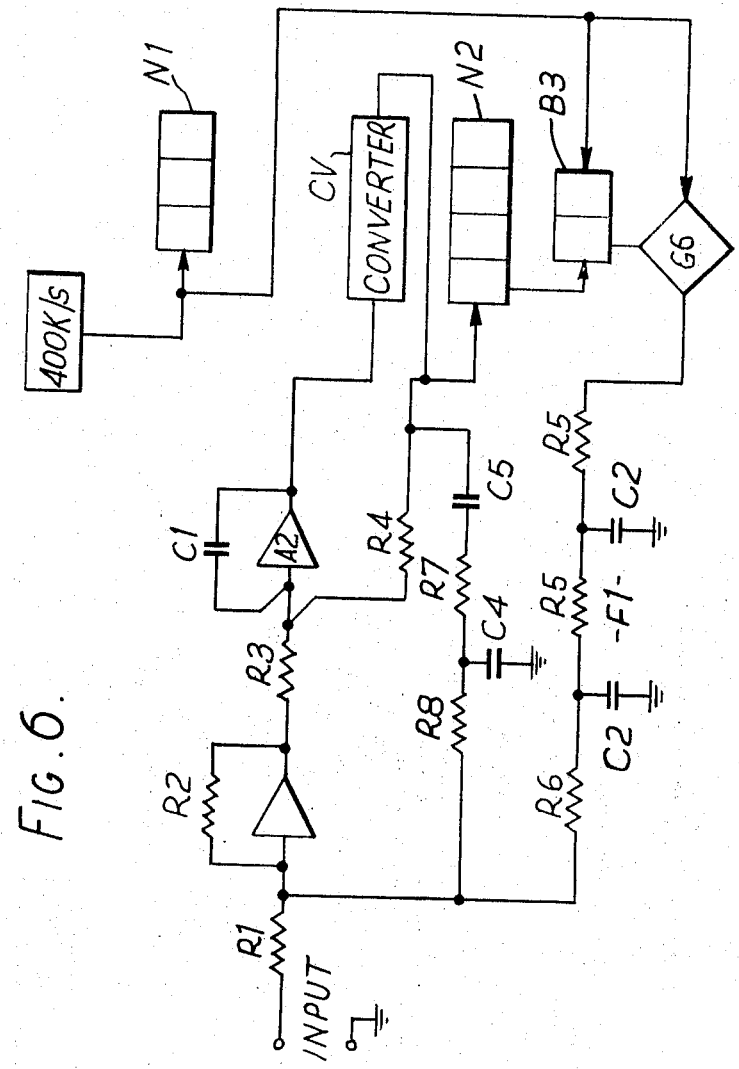

The invention will be described in more detail with reference to the accompanying drawings, in which FIGS. 1 to 5 are diagrams of five different embodiments respectively, and FIG. 6 shows a modification of FIG. 4.

In FIG. 1 the input voltage is applied through a protective resistor R1 to the input of a high-gain operational amplifier A1 with resistive feedback through R2 applied to a differential input of the amplifier. The output of amplifier A1 is applied through another resistor R3 to the input of a low-gain, high speed amplifier A2, illustrated as a single, grounded emitter, switching transistor T1. A feedback capacitor C1 provides the required integrating action. The output of the amplifier A2 is applied to a quantum circuit QC which functions in known manner to feed a quantum of charge to the input of A2 whenever the output exceeds a threshold level. This quantum acts in opposition to the input voltage. For simplicity only one polarity of input voltage and charge quantum is considered. The quantum circuit typically comprises a threshold circuit E1, clock source, gate G1, switch S2 and two counters N1 and N2 for counting clock pulses and quanta respectively as shown in FIG. 4.

The clock pulses are counted by a timing counter and when a predetermined number, say 10,000, clock pulses have been counted, a stop circuit terminates the operation of a second counter. The input voltage is proportional to the number of quanta which have been fed to the amplifier and it is this number which is counted by the second counter. This quantum circuit arrangement including the counters is well known in itself and is not illustrated in detail in FIG. 1.

The quanta of charge from the circuit QC are additionally applied to a low pass filter F1 composed of series resistors R5 and shunt capacitors C2. The smoothed output of the filter is applied through a resistor R6 to the input of amplifier A1, so linearising the voltmeter. The filter F1 increases the rise time of the quanta, so overcoming the previously mentioned difficulties, but if this were used alone (i.e., without the simple amplifier A2 and its fast feedback path), a burst of some tens of quanta would be released by the quantum circuit before the output of the amplifier A1 had time to change to cut them off. This would at least cause an inaccurate count and would probably also cause instability. Also, amplifier A2 and its fast feedback could work without A1 and F1, but not accurately. While the simple amplifier A2 has (by itself) insufficient gain it has a small time-delay and so integrates the quanta correctly. In experimental work with such a circuit a settling time to an accuracy of 0.1 percent of only 25 milliseconds has been achieved.

In the circuit of FIG. 2 the arrangement is made potentiometric by inverting the smoothed feedback and applying this to the low potential terminal T2 of the input, where it effectively opposes the input voltage. This is readily done by arranging for the circuit QC to supply complementary pulses, as shown, to the low pass filter F1.

FIG. 3 illustrates a rather different embodiment in which the amplifier and feedback arrangements are shown as of conventional form to the extent that there is only one feedback path although they could equally and advantageously include two paths as shown in FIG. 1 or FIG. 2. The novelty here resides in the nature of the quantum circuit which operates in two regimes, controlled by a bistable circuit B, to provide the fast-acting and slow-acting feedback. The circuit operates in the usual manner with the input applied to the integrating amplifier A. A measurement is started by clearing the counters. The amplifier is connected to a threshold circuit E1 which, however, opens two gates G1a and G1b whenever the threshold level is exceeded. Initially clock pulses are passed through gate G11b only from a gate G4 opened by the right hand side of the bistable B. These pulses are at one tenth the frequency of the clock source S1 because they are derived from the output of the first stage of the counter N1, which is a decade counter, and are arranged to have a mark space ratio of 1:1. Each pulse passing through gate G1b operates a switch S4 to feed a quantum of charge $\Delta T.VR/R4$ to the amplifier A and also causes the output counter N2 to advance by ten since this counter is again a decade counter and gate G1b is connected to the second stage instead of the first.

When the count N1 reaches some suitable value, close to the end of the measuring interval, say 9980 when the final count is to be 10,000, a change signal is applied to switch the bistable B whose left hand side opens a gate G3 instead of the gate G4. Undivided clock pulses pass through the gate G3 to the gate G1a direct from the source S1. The mark space ratio remains 1:1 and the quantum pulse amplitude is unchanged so the quantum magnitude drops to a tenth of its former value. Moreover when the gate G1a opens, one is counted into the first stage of the counter N2. When N1 reaches the final count it resets the bistable B and holds the counters N1 and N2 in the usual way. The result is given by the count in N2.

The different size quanta may be arrived at very simply by using a clock source frequency of twice the fast quantum frequency, the clock pulses defining the commencements of half cycles of the fast quantum frequency. In like manner the pulses obtained from the first stage of the counter N1 are at twice the slow quantum frequency and define the commencements of half cycles of the slow quantum frequency. The switch S4 can be a bistable switch alternately turned "on" and "off" by successive pulses received through the gates G1a and G1b. It is of no fundamental importance whether the counter N2 counts 1 or 10 per quantum or 2 or 20 per quantum but clearly divide by two circuits can precede both inputs to the counter if desired.

A specific example of suitable frequencies and periods uses an 8 mc/s clock source, with a period of 0.125µS. The fast quantum frequency is 4 mc/s with a period of 0.25µs and the slow quantum frequency is 400 kc/s with a period of 2.5µs. The counter N1 is a 4-decade binary-coded decimal counter and counts 10,000 clock pulses, i.e., the measurement period is 1.25 ms, corresponding to a frequency of 800 c/s. The changeover of the bistable B is effected at a count of 9980 clock pulses, that is after 1.2475 ms. Assuming that the input voltage is full scale and that the counter N2 counts quantum pulses (not clock pulses), its three most significant stages register 499 when the change-over is effected, no pulses at all having been fed into the first stage. In the last 2.5µs however, ten fast quantum pulses are counted into the least significant stage of N2 and the final, full scale count is 5000.

The discrimination or resolution of the device is 1:5000, given by the ratio of the shortest quantum period to the total measurement period. The accuracy however is not much less than that of a conventional instrument using the same measurement period but giving a resolution of 1:510 only.

Another advantage of FIG. 3 (and also FIGS. 4 and 5 to be described) lies in the reduction of errors due to the use of transistor switches to generate quantum wave-forms. Practical transistor switches fail in various ways to generate a perfectly square waveform. They do not act at all for a period after the switching wave is turned on; then they produce an exponential rise. Both the delay and the rise-time are temperature dependent, and moreover may change during the life of a transistor. Consequently the time-integral of the voltage output is not sufficiently accurately standardised when the quantum frequency is high. FIGS. 3, 4, 5 all reduce this error by using slow quanta to produce a substantial part of the total feedback charge during a typical measurement.

In FIG. 3 the same feedback path is used for both the slow and fast feedbacks, though separate paths could be provided if wanted.

FIG. 4 illustrates a development of the circuit of FIG. 1, and includes amplifiers A1 and A2 and associated components corresponding exactly to the components in FIG. 1 with the same references. The main linearising feedback is now however obtained by frequency division from the quantum pulses, division by 10 being used in this embodiment. The feedback is not taken direct from the output of the first stage of the decade counter N2 because the frequency of this counter changes with change in input voltage. The feedback pulses are required to be of constant length and therefore the output of the first stage of N2 sets a bistable B3 which thereupon opens a gate G6 to which is applied the 400 Kc/s output of the first stage of the counter N1. The first 400 Kc/s pulse then to arrive passes through the gate G6 and also resets the bistable B3. Thus a series of 1.25µs feedback pulses is derived with times of occurrence dictated by every tenth quantum pulse counted by the counter N2. The output of the gate G6 is integrated in the filter F1 and applied through R6 to the input of the amplifier A1. The use of the circuit B3, G6, introduces a delay in providing the divided-by-ten feedback pulses but this delay is only a few tens of microseconds which is of no consequence as the delay in the smoothing circuit is of the order of milliseconds.

As described so far the settling time of the meter is relatively long. By introducing another optional feedback path now to be described, the settling time may be reduced to 200 microseconds. This other feedback path takes the quantum pulse output of the switch S2 and smoothes it in series resistor R7 and shunt capacitor C4. The smoothed signal is applied to the input of amplifier A1 through a resistor R8. As shown a series capacitor C5 renders this feed-back a.c. in nature which is preferable though d.c. feedback could be used in this loop. The loop through F1 is necessarily d.c.

Clearly in niether FIG. 3 nor FIG. 4 is it necessary to use decimal submultiples of clock and quantum frequencies, and FIG. 5 in fact shows a circuit using binary scale division. The main feedback to the input of amplifier A2 is not now taken on the occurrence of every quantum pulse supplied by the circuit QC. Rather these pulses are divided in frequency by a chain of binary dividers D1, D2, D3 (which may constitute the initial stages of the counter N2). The output opposite the carry outputs of D1, D2, D3, marked 'ODD' is connected so that, when any stage changes from the 0 state to the 1 state negative feedback current is fed into Amplifier A2 via a capacitor C6, C7 or C8. Positive feedback current is fed on changes from the 1 state to the 0 state. The voltage swings on these dividers are substantially equal, and the values of capacitors C6, C7, C8 are in the ratio 1:2:4. Denoting by −1 a quantum of negative charge feedback, the quanta fed back are as follows:
State of:

| D1 | D2 | D3 | Feedback quanta |
| --- | --- | --- | --- |
| 0 | 0 | 0 | ) |
| 1 | 0 | 0 | ) −1 |
| 0 | 1 | 0 | ) +1−2 = −1 |
| 1 | 1 | 0 | ) −1 |
| 0 | 0 | 1 | ) ++1+2−4 = −1 |
| 1 | 0 | 1 | ) −1 |
| 0 | 1 | 1 | ) +1−2 = −1 |
| 1 | 1 | 1 | ) −1 |
| 0 | 0 | 0 | ) +1+2+4 = +7 |

It will be seen that seven separate unit quanta are fed back at seven occasions corresponding to successive outputs of Q.C; and then at the eighth occasion all seven quanta are withdrawn togehter. It is well known to those skilled in the art that such quant, with such connections, will produce corresponding stepwise changes in quanta, voltage output of A2, amounting to a seven-step staircase function.

As in the case of all the other circuits shown, an overriding d.c. feedback is also applied to A2 via a resistor R10.

The linearising feedback to A1 is taken from the ÷8 stage of the timing counter N1 through a gate G7 which is opened by the output of D3. This linearising feedback is applied through R9. In order to prevent the gate G7 being closed prematurely, its output also temporarily inhibits the quantum circuit QC.

FIG. 6 shows a modification of FIG. 3 in which simplification has been effected because of the appreciation that the fast quanta do not have to be completely accurate when they are used simultaneously with slow quanta since the latter will correct any inaccuracies. Therefore the 4Mc/s source is replaced with a 400 Kc/s source and the lowest significance stage of N1 is removed. The 400 Kc/s pulses are applied as in FIG. 3 to the bistable B3 and the gate G6, the gate acting as a quantum generator under the control of the bistable. The threshold circuit E1, gate G1 and switch S2 are replaced by a voltage to frequency converter CV of known form which produces fast quantum pulses at a frequency varying up to 4Mc/s for a full scale reading.

The converter CV provides the fast quanta to the feedback paths through R4 and C5, R7, R8 as well as the input to N2.

Because of the correcting action of the slow quantum generator N2, B3, G6, the converter CV may be up to 10 percent non-linear before it impinges on the accuracy of the voltmeter.

Many modifications can obviously be made to the embodiments illustrated. Various combinations of single input, differential and potentiometric amplifiers may be used, together with quanta of both polarities (as in FIG. 2) in order to obtain feedback paths of the correct sense.

We claim:

1. A digital voltmeter comprising an integrating amplifier having an input and an output, means for applying an input voltage continuously to said input; a clock pulse source, a first clock pulse counter connected to said clock pulse source and having an output provided from a low significance stage thereof; first and second feedback means both coupled to said amplifier output, said first feedback means being responsive to said low significance stage output and to said clock pulse source to make available standard units of charge when said level exceeds a predetermined limit for feedback to the amplifier input, said second feedback means being responsive thereto to provide smaller units of charge for feedback to said amplifier input; a second pulse counter having a lowest significance input and a higher significance input coupled respectively to said second and first feedback means; and sswitching means responsive to said first counter to render only the first feedback means operative until the first counter reaches a predetermined count and then to render only the second feedback means operative until the first counter reaches a final count.

2. A digital voltmeter comprising the combination of an integrating circuit having an input and an output; means for applying an input voltage continuously to said circuit input; circuit means connected between said output and input of said integrating circuit for responding to the output level of said integrating circuit to control the feeding into the input of said integrating circuit standard units of charge so as to restore said level toward a datum value; timing means defining a measurement interval and a changeover time towards the end of said interval, means responsive to said timing means for applying units of charge having a frequency greater than and a size less than the standard units of charge to the input of said integrating circuit for the portion of said measurement interval between said changeover time and the end of said interval and wherein said circuit means connected between said output and input of said integrating circuit further comprises a clock pulse source; a conductive path connected to said integrating circuit input; first gate means connected between said clock pulse source and said conductive path for coupling pulses to said integrating circuit input whenever said first gate means is activated; level responsive means connected to said integrating circuit output and to said first gate means for activating said first gate means whenever the output of said integrating circuit exceeds a predetermined level; a second gate means connected to said conductive path said first and second gates being simultaneously activated by said level responsive means; and wherein said means responsive to said timing means includes a third gate connected between said clock pulse source and said first gate means; and a fourth gate with an output terminal connected to said second gate; and said apparatus further comprises a counter having an input connected to said pulse source and one output from a high significance stage thereof connected to said fourth gate; said fourth and third respectively being sequentially activated by said timing means to couple pulses to said second and first gates.

3. Apparatus according to claim 2 wherein said timing means comprises bistable circuit means having inputs connected to two lower significance stages of said counter and outputs connected to sequentially activate said third and fourth gates.

4. A digital voltmeter comprising an integrating circuit having an input and an output; means for applying an input voltage continuously to the input of said circuit; a clock pulse source; a first clock pulse counter connected to said source, said counter having an output provided from a low significance stage thereof; first and second circuit means both coupled between the output and input of said integrating circuit said first circuit means being responsive to the output level of said integrating circuit to provide large standard units of charge from said low significance stage of said counter to said input when the output level of said integrating circuit exceeds a predetermined level, said second circuit means being responsive to the output level of said integrating circuit to provide smaller standard units of charge from said clock pulse source to said integrating circuit input when the output level of said integrating circuit exceeds said predetermined level; switching means responsive to said first counter for activating only said first circuit means until said first counter reaches a predetermined count and for then activating only said second circuit means until said first counter reaches a final count; and a second pulse counter having a lowest significance input coupled to said second circuit means and a higher significance input coupled to said first circuit means, said second counter being operative to accumulate a pulse count from said first and second circuit means to represent the value of said input voltage.

* * * * *